United States Patent [19]

Lane, III

[11] Patent Number: 4,458,257

[45] Date of Patent: Jul. 3, 1984

[54] INK CARTRIDGE AND A METHOD FOR MAKING THE SAME

[75] Inventor: Charles E. Lane, III, Meadowbrook, Pa.

[73] Assignee: Honeywell Inc., Minneapolis, Minn.

[21] Appl. No.: 447,742

[22] Filed: Dec. 8, 1982

[51] Int. Cl.$^3$ ............................................. G01D 15/16
[52] U.S. Cl. .................................... 346/141; 400/470
[58] Field of Search ...................... 346/141, 140 R, 46; 400/470; 101/368

[56] References Cited

U.S. PATENT DOCUMENTS 3,838,430  9/1974  Digney ........................... 346/141 X
4,210,917  7/1980  Lane ................................ 346/141 X Primary Examiner—Joseph W. Hartary
Attorney, Agent, or Firm—Mitchell J. Halista; Trevor B. Joike

[57] ABSTRACT

An ink cartridge has a plurality of ink supplying elements coaxially mounted on a shaft for rotation therewith with each element having an ink containing layer molded integrally with an ink impervious layer covering a side face of the ink layer while an exposed radially outward edge face provides an ink supply surface. The ink containing layers are initially each molded into the ink impervious layer which provides a covering for one side face and a radially outward edge face of the ink containing layer. The edge face covering is subsequently removed from the ink containing layer to expose an ink supply surface of the ink layer. A substantial portion of the ink impervious material is retained in the exposed ink supply surface of the ink containing material to reinforce the surface pores therein while permitting an ink flow therefrom. The ink elements are subsequently assembled on the coaxial shaft in a parallel layered arrangement to position an ink impervious side face covering layer adjacent to an uncovered side face of an ink containing layer of an adjacent ink supplying element.

12 Claims, 6 Drawing Figures

U.S. Patent  Jul. 3, 1984  4,458,257
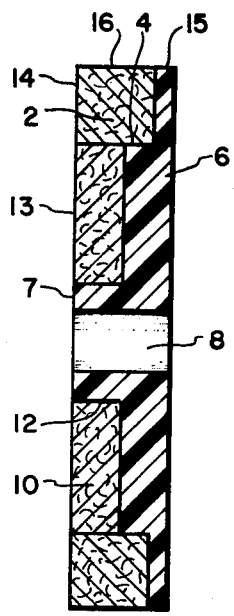
FIG. I
FIG.2A  FIG.2B  FIG.2C  FIG.2D
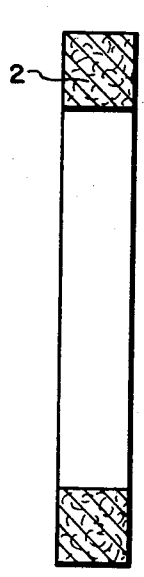 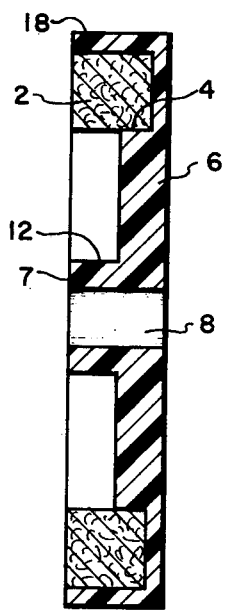 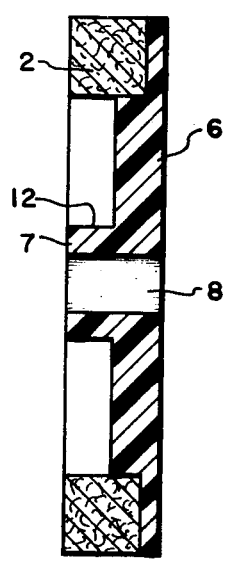 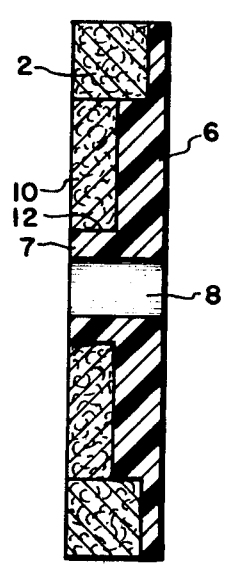
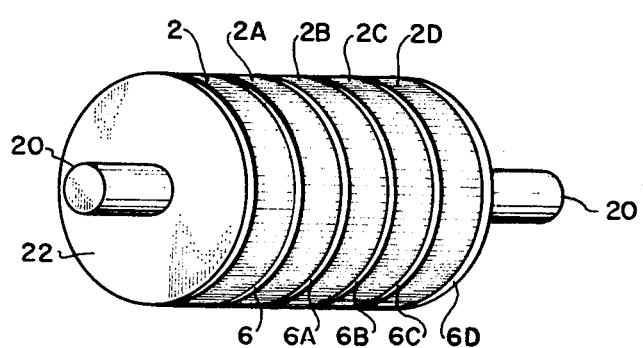
FIG. 3

INK CARTRIDGE AND A METHOD FOR MAKING THE SAME

BACKGROUND OF THE INVENTION

1. Field of the Invention

The present invention is directed to multicolor recorders. More specifically, the present invention is directed to an ink cartridge for a multicolor recorder.

2. Description of the Prior Art

A multicolor ink cartridge for a recorder has been used to provide a means for selectively introducing a desired ink color for printing by selectively energizable recording elements on a recording medium in the recorder. Alternatively, a fixed color recording operation in the recorder can be effected by maintaining a preselected alignment of the recording head in the recorder and a desired color in the multicolor ink cartridge. An example of a multicolor cartridge and a recorder for using the same is shown in U.S. Pat. No. 4,210,917 which is assigned to the assignee of the present invention. While the ink cartridge shown therein provides a multicolor ink source suitable for use with a recorder either in a single or plural color operation, that ink cartridge structure has inherent limitations occasioned by the number of separate parts used in the cartridge which require excessive manufacturing costs and assembly time. Additionally, the ink containing elements forming the ink cartridge have a relatively short operating life as a result of the closure of ink supplying surface pores by the impact of the printing elements from the print head thereon which effect produces an inability to utilize the full capacity of the ink stored therein by interrupting ink supplying capillary paths to the recording surface of the ink cartridge. Accordingly, it would be desirable to provide an ink cartridge capable of being assembled by an automatic assembly operation as well as exhibiting a significantly improved operating life and utilization of the recording ink stored therein.

SUMMARY OF THE INVENTION

An object of the present invention is to provide an improved multicolor ink cartridge.

Another object of the present invention is to provide a method for making an improved ink cartridge.

In accomplishing these and other objects, there has been provided, in accordance with the present invention an ink cartridge having a support shaft, a plurality of ink containing layers attached to the shaft, each layer having pores edged with an impact resistant material in a radially outward face and a plurality of ink impervious layers attached to the shaft with each of the impervious layers being integrally molded with a side face of a respective one of the ink layers to isolate the ink layers from each other along the shaft and to provide the impact resistant material for edging the pores. A method for making the ink cartridge includes the steps of integrally molding each of the ink impervious layers on corresponding ones of the ink containing layers to cover a side face and a radially outward edge face of the ink layer and removing the impervious layer to expose the edge of the ink layer.

BRIEF DESCRIPTION OF THE DRAWINGS

A better understanding of the present invention may be had when the following detailed description is read in connection with the accompanying drawings, in which:

FIG. 1 is a cross-sectional illustration of an ink reservoir element embodying an example of the present invention, FIGS. 2A, 2B, 2C and 2D illustrate the steps in the method of manufacturing the ink reservoir element shown in FIG. 1 and FIG. 3 is an assembled ink cartridge using the ink reservoir element shown in FIG. 1.

DESCRIPTION OF THE PREFERRED EMBODIMENT

Detailed Description

Referring to FIG. 1 in more detail, there is shown an ink reservoir element for use in an ink cartridge having an ink containing ring 2, which may be of a felt type material, supported on a shoulder 4 of an ink impervious disc 6. The disc 6 has a center hub 7 with a coaxial opening 8 for mounting the disc 6 on a coaxial support shaft as described hereinafter. An ink reservoir washer 10 of a felt type material similar to that of the ring 2 is positioned adjacent to a radially inner surface of the ring 2 and is located in a coaxial recess 12 of the ink impervious disc 6. An exposed side face 13 of the washer 10 is substantially coextensive with a side face 14 of the ring 2 and an end of the hub 7. Concurrently, a peripheral edge 15 of the disc 6 is substantially coextensive with an edge face 16 of the ring 2.

In FIGS. 2A, 2B, 2C and 2D are illustrated the steps for manufacturing the ink reservoir element shown in FIG. 1. An ink containing ring 2 made of a felt type material, as shown in FIG. 2A, is positioned in a mold (not shown) and a suitable thermoplastic material, e.g., Nylon, is injected or compressed into the mold around the ink containing ring 2 to form an ink impervious layer 6. The molded ink impervious layer 6 includes a coaxial recess 12 radially inwardly of the ring 2, a center coaxial hub 7 with a coaxial hole 8 and an outer surface 18 extending an outer side face of the layer 6 across the outer edge face 16 of the ink ring 2, as shown in FIG. 2B. As shown in FIG. 2C, a machining operation is used to remove the outer layer 18 from the edge face of the ink ring 2 to create the peripheral edge 15 of the disc 6 substantially flush with the outer edge surface 16 of the ring 2. However, during the molding operation, the plastic material used for the disc 6 is allowed to penetrate the outer edge surface 16 of the ring 2 to the extent of coating the fibers forming the surface of the ring 2 while allowing an ink supplying pore structure to exist at the outer edge surface 16 of the ring 2. This plastic material coating is effective to significantly improve the impact resistance of the fibers at the outer edge surface 16 of the ring 2 by edging the surface pores to minimize the closure of the ink supply pores during the recording impact by the recording elements of a recording head during the recording operation. Thus, the recording ink which is carried by capillary action from the interior of the ring 2 to the outer peripheral edge face 16 will continue to be available at the plastic material edged surface pores during an extended recording life of the ink reservoir element. In FIG. 2D, a secondary ink reservoir washer 10 is inserted within the recess 12 of the disc 6 in contact with the radially inner surface of the ring 2 to provide an additional source of recording ink which is distributed into the ring 2 by capillary flow from the washer 10.

In FIG. 3, there is shown an assembled ink cartridge using a plurality of the ink reservoir elements shown in FIG. 1 mounted in parallel on a coaxial shaft 20. Additionally, a separate ink imprevious washer 22 is mounted on the end of the ink cartridge layers adjacent to an exposed side face of a ring 2 and washer 10 in a first one of the ink reservoir elements to provide an ink impervious end cover for the ink ring 2 and washer 10 therein. Thus, the first ink reservoir element has a ring 2 and a molded disc 6 attached thereto while the second ink reservoir element has an ink containing ring 2A with a molded disc 6A attached thereto. Similarly, the third, fourth and fifth ink rings 2B, 2C and 2D have integrally attached discs 6B, 6C and 6D attached thereto, respectively. The shaft 20 is arranged to be mounted in a recorder and, advantageously, as shown in the aforesaid patent, may be attached to a means for rotating the cartridge 2 to distribute the wear around the periphery of each of the ink containing rings.

Accordingly, there has been provided, in accordance with the present invention, an improved ink cartridge for use in a recorder and a method for manufacturing the same.

The embodiments of the invention in which an exclusive property or privilege is claimed are defined as follows:

1. An ink cartridge comprising
   a support shaft
   a plurality of ink containing layers attached to said shaft, each of said layers having pores edged with an impact resistant material in a radially outward edge face
   and
   a plurality of ink impervious layers attached to said shaft, each of said ink impervious layers being integrally molded with a side face of a respective one of said ink containing layers to isolate said ink containing layers from each other along said shaft and to provide said impact resistant material for edging said pores.

2. An ink cartridge as set forth in claim 1 wherein said ink impervious layers are made of a thermoplastic material.

3. An ink cartridge as set forth in claim 1 wherein said ink containing layers are each impregnated with a respective ink color.

4. An ink cartridge as set forth in claim 1 wherein said ink layers and said impervious layers are orthogonal to said shaft.

5. An ink cartridge as set forth in claim 4 wherein said ink layers and said impervious layers are coaxial with said shaft.

6. An ink supply element comprising
   an ink containing layer having impact resistant material edged pores in a radially outward edge face and
   an ink impervious layer adjacent to a side face of said ink containing layer to prevent ink loss from said side face.

7. An ink supply element as set forth in claim 6 wherein said ink layer includes an ink containing ring and an ink containing washer coaxial with said ring and in contact therewith.

8. An ink supply element as set forth in claim 6 wherein said ink impervious layer is made of a thermoplastic material.

9. An ink supply element as set forth in claim 6 wherein said ink impervious layer is integrally molded with said ink containing layer to provide said impact resistant material for edging said pores.

10. An ink supply element as set forth in claim 9 wherein said ink imprevious layer is made of a thermoplastic material.

11. A method for making an ink supply element including the steps of molding an ink impervious layer across a side face and a radially outward edge face of an ink containing layer and removing the impervious layer from the edge face to expose the ink layer.

12. A method as set forth in claim 11 wherein the ink layer is a ring shaped element and including the further step of insering an ink containing washer to be coaxial with the ring and in contact therewith.

* * * * *